(12) United States Patent
Lang et al.

(10) Patent No.: US 11,892,954 B2
(45) Date of Patent: Feb. 6, 2024

(54) SELF-ADDING SMARTCARD READER SYSTEM

(71) Applicant: Xerox Corporation, Norwalk, CT (US)

(72) Inventors: Joseph H. Lang, Webster, NY (US); Christopher L. Stone, Blasdell, NY (US)

(73) Assignee: Xerox Corporation, Norwalk, CT (US)

( * ) Notice: Subject to any disclaimer, the term of this patent is extended or adjusted under 35 U.S.C. 154(b) by 489 days.

(21) Appl. No.: 17/083,358

(22) Filed: Oct. 29, 2020

(65) Prior Publication Data

US 2022/0138116 A1 May 5, 2022

(51) Int. Cl.
*G06F 13/10* (2006.01)
*G06K 7/00* (2006.01)
*G06F 9/4401* (2018.01)
*G06F 3/12* (2006.01)

(52) U.S. Cl.
CPC ............ *G06F 13/102* (2013.01); *G06F 3/121* (2013.01); *G06F 3/123* (2013.01); *G06F 3/1225* (2013.01); *G06F 3/1234* (2013.01); *G06F 9/4411* (2013.01); *G06K 7/0008* (2013.01); *G06F 3/1281* (2013.01)

(58) Field of Classification Search
CPC ...... G06F 3/1225; G06F 3/1234; G06F 3/121; G06F 3/123; G06F 3/1281; G06F 13/102; G06F 13/105; G06F 9/4411; G06F 8/65; G06K 7/0008
See application file for complete search history.

(56) References Cited

U.S. PATENT DOCUMENTS

| | | |
|---|---|---|
| 7,251,812 B1 | 7/2007 | Jhanwar et al. |
| 7,518,745 B2 | 4/2009 | Guerraz et al. |
| 7,904,608 B2 | 3/2011 | Price |
| 8,341,083 B1 | 12/2012 | Jain |
| 8,424,770 B2 | 4/2013 | Mounier et al. |
| 8,967,477 B2 | 3/2015 | Braams |
| 9,774,749 B1 | 9/2017 | Skrainar et al. |
| 10,073,664 B2 | 9/2018 | Skrainar et al. |
| 2003/0051040 A1 | 3/2003 | Tanikawa et al. |
| 2013/0305238 A1 | 11/2013 | Frayssignes et al. |
| 2017/0364346 A1* | 12/2017 | Peng .................. G06F 13/4068 |

FOREIGN PATENT DOCUMENTS

WO 2005001665 A2 1/2005

* cited by examiner

*Primary Examiner* — Ernest Unelus
(74) *Attorney, Agent, or Firm* — Gibb IP Law Firm, LLC (57) ABSTRACT

A downloaded app controls a device to recognize whether a connected card reader is an unsupported card reader or whether an unsupported card is supplied to the connected card reader. The app automatically generates support for the unsupported card reader or unsupported card by reading the identifying information from the unsupported card reader or unsupported card, modifying an existing driver support file by adding the identifying information to the existing driver support file to create a modified driver support file, and testing the unsupported card reader or unsupported card using the modified driver support file. If the tests are successful, the app then supplies the modified driver support file to other devices separate from the printer.

17 Claims, 7 Drawing Sheets

FIG. 1

| App Control Panel | | |
|---|---|---|
| Captured Data | ATR String: | 12 23 34 45 56 67 78 89 90 |
| | Card Reader PID: | 0123F |
| | Card Reader VID: | 4567G |
| | | |
| Requested Data | Manual Mode | Auto Mode |
| | Card Type: | Gemalto ID Prime MD |
| | Card Desc: | MD830b rev 2 |

FIG. 2

| App Control Panel | | |
|---|---|---|
| Verification | Tests | Response |
| | Test 1: | Pass/Fail |
| | Test 2: | Pass/Fail |
| | Test 3: | Pass/Fail |
| | Test 4: | Pass/Fail |
| | Test 5: | Pass/Fail |
| | | |

SELF-ADDING SMARTCARD READER SYSTEM

BACKGROUND

Systems and methods herein generally relate to card readers and access cards, such as smartcards and smartcard readers, and more particularly to systems that add support to unsupported card readers and/or access cards.

Access to various devices can be restricted to authorized users in a number of ways. For example, users may be required to enter a password or correct username into a user interface in order to gain access to different devices. However, these access restrictions have limited security resulting in unauthorized use of such devices occurring at times.

Physical access cards (such as smartcards) provide an increased level of user access control because the user needs to physically provide a valid physical access card to a card reader to gain access to the device. In some situations, the access card may be the only item needed to gain access to restricted devices, eliminating the need for users to remember passwords or usernames. In other situations, multifactor authentication techniques can be used in combination with access cards (and/or passwords, etc.).

Many manufactures produce access cards and card readers and many vendors modify such elements in unique ways. While standards organizations attempt to reign in such divergences among smartcards and card readers, those differences between different smartcard products and vendors make adding previously unsupported card readers or unsupported cards to existing systems a time and expense intensive operation.

SUMMARY

In order to address the foregoing, systems herein include (among other components) an access-controlled device (a printer is used as an exemplary device below) having a connected card reader, any computer in communication with the printer through a computerized network, and a computer application (app) maintained by the computer server.

The computer server is adapted to provide the app to the printer. The app is adapted to control the printer to recognize whether the connected card reader is an unsupported card reader or whether an unsupported card is supplied to the connected card reader. In one example, the printer or other access-controlled device may only be operated using a supported access card and card reader. Supported access cards and card readers are ones identified within at least one driver support file stored within the printer, while an unsupported access card and card reader is one not identified within a driver support file stored within the printer.

The app is adapted to automatically modify driver support files to communicate with the unsupported card and card reader by: reading identifying information from the unsupported card and card reader; modifying at least one driver support file by adding the identifying information to the driver support file; testing the unsupported card and card reader using the modified driver support file(s); and supplying the modified driver support file(s) to other devices separate from the printer. This identifying information from the unsupported card and card reader can be, for example, vendor identification, product identification, an answer to reset (ATR) string of the unsupported card, etc.

The app facilitates the testing process by first storing a backup of the existing driver support file of supported access cards and card readers. Then the app adds the identifying information of the unsupported card and card reader to the existing driver support file to generate a modified driver support file and facilitates (through a system administrator, etc.) a series of communication and operation tests on the unsupported card or card reader using the modified driver support file. If the tests are unsuccessful, the app deactivates the modified driver support file and reactivates the backup of the existing driver support file; however, if the tests are successful, the app leaves the backup of the existing driver support file deactivated as it is now superseded by the modified driver support file.

The app performs the process of supplying the modified driver support file(s) to the other devices separate from the printer by creating a downloadable clone file from the modified driver support file(s) and sharing the downloadable clone file with the other devices separate from the printer through the computerized network. This allows all future-presented access cards and card readers (that have the same identifying information as the unsupported card and card reader) to be supported access cards and card readers on all the other devices that the clone file is shared with.

Also, various methods herein provide the app to the access-controlled device (e.g., again an exemplary printer, etc.). These methods then use the downloaded or resident app to control the printer to recognize whether the connected card reader is an unsupported card reader or whether an unsupported card has been supplied to the connected card reader. When this occurs, the app can automatically, manually, or semi-automatically begin the process of generating support for the unsupported card or card reader.

More specifically, the app automatically (or the system administrator manually) modifies driver support files for the unsupported card and card reader by reading the identifying information from the unsupported card and card reader, establishing one or more modified driver support files containing the identifying information of the unsupported card and card reader, and testing the unsupported card and card reader using the modified driver support file(s). If the tests are successful, the app then supplies the modified driver support file(s) to other devices separate from the printer so that the unsupported card and card reader will then be recognized on all external devices to which the modified driver support file(s) was supplied.

The testing process is facilitated by the app first storing a backup of the existing driver support file before any changes are made to the existing driver support file. Then the app adds the identifying information from the unsupported card or card reader to the existing driver support file, to generate the modified driver support file, and facilitates a series of communication and operation tests of the unsupported card and card reader using the modified driver support file. If the tests are unsuccessful, the modified driver support file is deactivated and the backup of the existing driver support file is reactivated; however, if the tests are successful, the backup of the existing driver support file is left deactivated.

The process of supplying of the modified driver support file(s) to the other devices separate from the printer is performed by the app supplying the clone file through a computerized network. This clone file is then shared with the other devices separate from the printer through the computerized network. Then, access cards and card readers having the identifying information of the unsupported card and card reader are supported access cards and card readers on the other devices that are separate from the printer, by operation of the clone file being shared.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, differences between different smartcard products and vendors make adding unsupported card readers and access cards (sometimes referred to herein as smartcard products for shorthand) to existing systems a time and expense intensive operation. Because specialty technologists are required to manually modify driver support files to communicate with unsupported smartcard products, their time spent acquiring the necessary vendor and product information, and their time spent testing and installing the driver support files for the new smartcard products results in substantial time delays and expense for the introduction of new smartcard products.

In one simplified example, a card reader manufacturer may wish to have one of their accessories (e.g., an access card or card reader) added to a list of accessories that are supported as connectable items for a production device (e.g., a multi-function printer, etc.). Traditionally, the accessory manufacturer would contact representatives of the production device manufacturer and manually provide communications and operational data of the new accessory to the production device manufacturer. Then a long and expensive manual process (statement of work and transfer agreements, confidential disclosure agreements, negotiation of licenses, etc.) is undertaken by the production device manager to create, test, install, and document the modified driver support files, firmware, etc., to allow the new accessory to work seamlessly when used with the production device. This process can take, for example, 3-9 months or even years if new drivers or middleware are needed and can be very expensive.

In view of such issues, this disclosure presents systems and methods that fully or partially automate the process of adding support for unsupported access cards and card readers to occur at the access-controlled device and at the time when they are first presented to the access-controlled device. Specifically, a resident firmware or a downloadable app can be used at the access-control device to capture the card reader or card information, allow the user to supplement such information, and create a modified driver support file containing the new device data set. Then, the modified driver support file is activated, and the user is stepped through a verification process. Once verification is complete, the application converts the driver support file to an installation file for distribution to other devices. Finally, the application automatically reports the newly added device information to a repository for use in documentation or other applications. This dramatically reduces the time delay and expense seen when modifying driver support files for such access cards manually.

The systems and methods herein provide user-led innovation to improve the process for adding new card readers and access to existing products (e.g., where the customer, analyst, vendor, or accessory partner does the enablement at the point of need). This enables dramatically faster, more responsive delivery time (minutes) for access card and card reader enablement compared to current remote manual customization process (3-9 months) and similarly lowers the cost compared to current customization process. Further, with these methods and systems, machine learning can be used to discover which card reader and card vendors and device models are attempted to be used or are being used with existing devices, which might not otherwise be easily tracked by a large multi-national manufacturer that has large numbers of diverse devices. Also, the systems and methods herein reduce the customization staffing needs, allow flexibility to do more lucrative customizations, and provide potential sales revenue based on the sale of the app used to create the modified driver support files.

Figure 1:
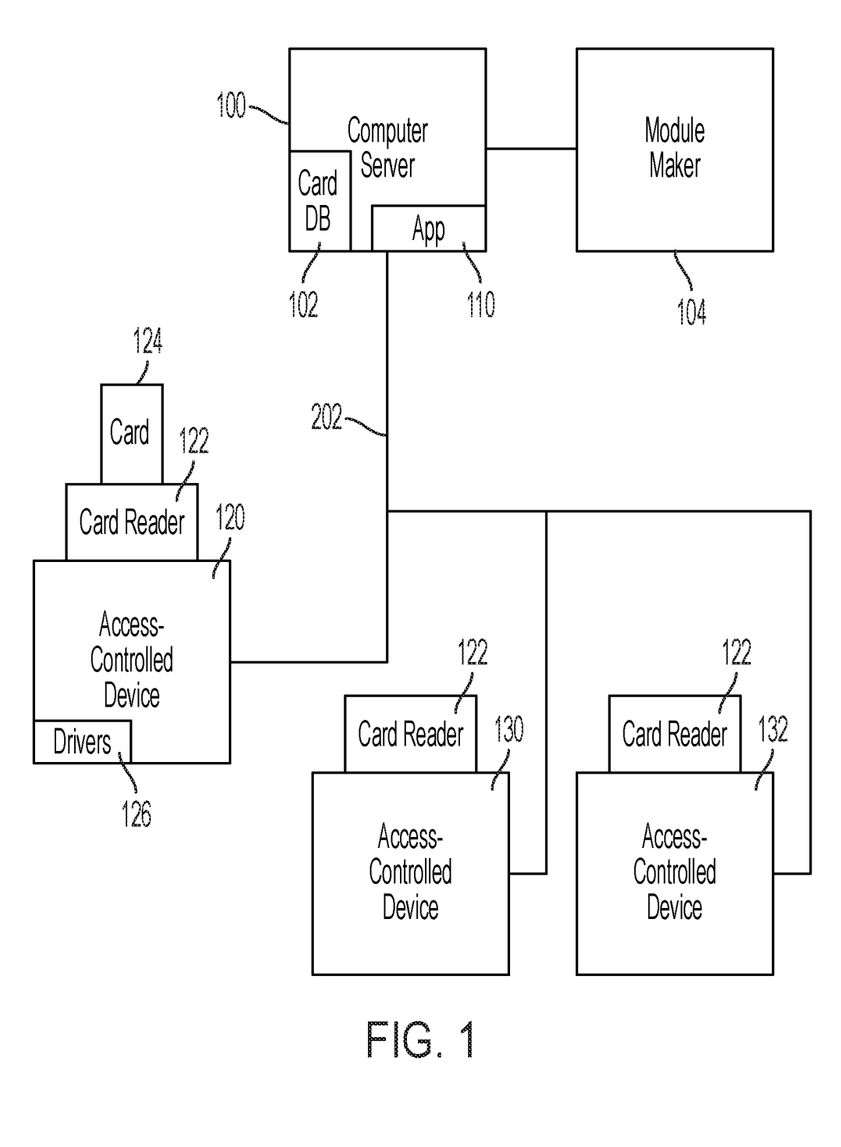
FIG. 1 is a schematic diagram illustrating devices herein.

As shown in FIG. 1, for example, the systems and methods herein are used with an access-controlled device 120. While a printer is used as an exemplary access-controlled device 120 at many points herein, any device that has its access controlled can be used with systems and methods herein including, but not limited to scanners, facsimile machines, internet portals, self-service kiosks, shared computers, secure computers, vehicles, robotic devices, secure physical storage devices, gaming systems, home appliances, entertainment systems, etc., and multi-function devices (MFDs) having one or more of the foregoing components, etc. The access-controlled device 120 shown in FIG. 1 is intended to represent all such devices and similar devices.

Further, with systems herein any computer 100 can be placed in communication with the access-controlled device 120 through a computerized network 202. At least one computer application (app 110) and access card/card reader database 102 are maintained by the computer server 100. For example, the app could be one maintained within an app gallery and the computer could be a service engineers' computer that remotely delivers a software update to the device that contains the app, or a computer/server that delivers software updates to the device, etc.

Regardless of the function, type, or nature of the access-controlled device 120, for access control these devices use a card reader 122 that reads access cards 124 and, in most situations, access is only granted to the access-controlled device 120 if a valid (supported) card 124 is presented to a valid (supported) card reader 122. Implementations herein allow new, previously unsupported, card readers 122 and cards 124 to be easily added to such devices 120 and these systems/methods help modify driver support files to communicate with such new cards 124 and card readers 122.

In greater detail, the app 110 can be resident on the access-controlled device 120 in firmware or pre-installed programs or software (e.g., such as apps, etc.) or the computer server 100 can download the app 110 to the access-controlled device 120. In one example, the app can be provided (potentially for a fee) at the request of a support person or other user, and the app 110 can be auto-installed on the access-controlled device 120 once downloaded. Therefore, the app 110 can be a purchased app or embedded functionality in the device firmware/software; and all such sets of computer instructions are referred to herein as an "app" for simplicity of discussion.

The functionality of the app 110 can be accessible, for example, on a device Web user interface (UI) where a system administrator may login to the device remotely, navigate to an authentication configuration webpage, and select that they want to modify the one of the app's ancillary files (e.g., smartcard.xml file), etc. With this, the system administrator can download a smartcard package that can include, for example: 1) the smartcard.xml file; 2) file listing the ATR's that have been tried on the device (including the unsupported card); and 3) a schema file used to edit the .xml file; etc.

In greater detail, while drivers are used to allow devices to communicate with peripherals, drivers need driver support files 126 to operate properly. One example of a driver support file 126 is a smartcard.xml file that is a "whitelist" file containing: 1) a list of approved card ATR's; 2) driver support files that need to be loaded to communicate with the card; 3) descriptions of the card, etc.

The app 110 is adapted to help the access-controlled device 120 when an unsupported (unknown) card reader 122 is being connected to the access-controlled device 120 or when an unsupported (unknown) card 124 is supplied to a supported, existing connected card reader 122. Supported card readers 122 and cards 124 are those identified within at least one existing driver support file stored within driver support files 126 of the access-controlled device 120, while an unsupported card reader 122 or card 124 is one not identified within at least one driver support file stored within the driver support files 126 of the access-controlled device 120. Note that the representation of driver support files 126 herein includes all support files as well as the driver support file execution/communication files, installation files, etc., even though such are not illustrated or discussed separately herein.

Thus, when a new card reader 122 is physically added or attached (e.g., newly hardwired connected to, or newly plugged into a standardized port such as a universal serial bus (USB) port) or a new card 124 is supplied to an existing supported card reader 122, the card reader 122 and/or card 124 is interrogated by the access-controlled device 120 and the identifying information of the card reader 122 or card 124 are read (e.g., using standard protocols, such as a standardized chip card interface device (CCID)). If the card reader 122 and/or card 124 are identified within any of the existing driver support files 126 of the access-controlled device 120, then at least one of the driver support files 126 already contains the details of the communications protocols and other communication settings allowing data flow to and from the access-controlled device and the card 124 through the card reader 122 without other user action being needed.

In other words, the driver support files 126 of the access-controlled device 120 will be preloaded (or updated in a manner) to contain software (e.g., communication instructions and protocols, etc.) that permits the access-controlled device 120 to communicate with products (e.g., card readers, cards, etc.) that a first device manufacturer produces. However, the existing driver support files 126 may not allow communications with products (e.g., card readers, cards, etc.) that a different manufacturer produces. Alternatively, the driver support files 126 may maintain communication information for a first class or type of devices, but not another class or type of devices. As noted above, traditionally a technical specialist would need to manually address such a situation, which can be expensive and can take months.

Thus, if the type, brand, model, etc., of card reader 122 and/or card 124 is not identified by any of the existing driver support files 126, the access-controlled device 120 will not be able to communicate with the new card reader 122 or new card 124. In view of this, the systems and methods herein facilitate processing that automatically adds information to the existing driver support files 126 so that the access-controlled device 120 supports the card reader 122 and card 124; and this avoids the traditional need for a technical specialist to modify driver support files and also avoids the associated expense and time delay. Indeed, the app 110 can be free or low cost and the card reader 122 or card 124 can be enable support for new devices and new cards in minutes, as opposed to months.

As a general overview, the app 110 is adapted to automatically modify existing driver support files to communicate with the unsupported card reader 122 or unsupported card 124 by: reading identifying information from the unsupported card reader 122 or unsupported card 122; modifying the driver support files 126 by adding the identifying information read from the unsupported card reader 122 or unsupported card 124 to the driver support files 126; testing the unsupported card reader 122 or unsupported card 124 using the modified driver support files 126; and supplying the modified driver support files 126 to other devices 130, 132 separate from the access-controlled device 120 if the modified driver support files 126 pass the testing process.

In greater detail, the app 110 discovers some identifying information from the card reader 122 or card 124, such as vendor identification (VID), product identification (PID), an answer to reset (ATR) string of a card, the device type, device manufacturer or family, etc., which can reveal detailed identifying information of the card reader 122 or card 124. Once this identifying information is detected by the app 110, it can optionally present this to the user to allow the user to confirm whether the discovered information is correct. The user can supplement the identifying information manually or the identifying information can be supplemented with matching information from external databases automatically. This can also be useful if the app 110 is not able to automatically detect all needed identifying information that the user may be in possession of through product materials or other knowledge base.

Figure 2:
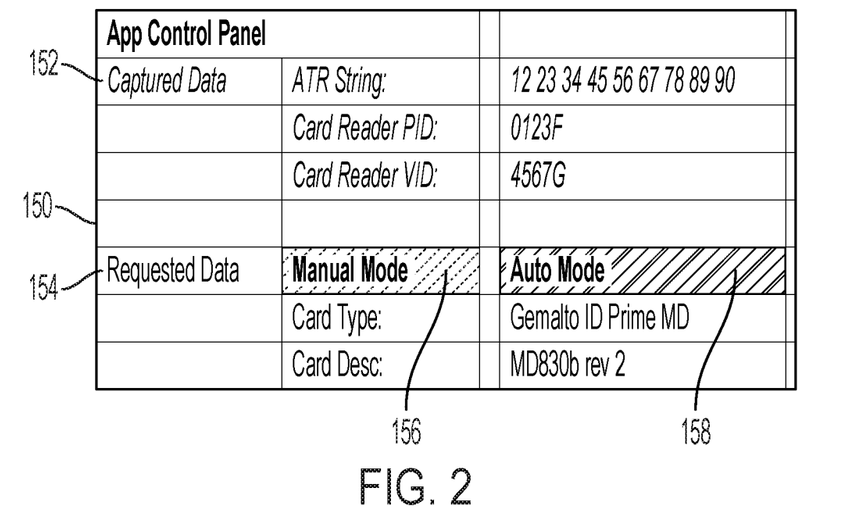
FIGS. 2-3 are schematic diagrams illustrating display screens provided by devices herein.

FIG. 2 shows one example of a display screen 150 that can be provided to confirm, change, or add information to help the app 110 when adding support for the new card reader 122 or card 124. Specifically, FIG. 2 shows captured data 152 and data 154 that it requests that the user confirm or supplement. Specifically, the user can simply accept data 158 automatically discovered in remote databases or the user can change/supplement the requested data 154 in manual mode 156.

For example, in the automatic mode 158, the app can connect to a card reader database (e.g., item 102 in FIG. 1, or another database maintained separately from the access-controlled device 120) and the app can search the database 102 for card type and description data 154 based on the captured data 152. In response to the search, the app receives such data and automatically populates the card type and description data fields shown below 158 in FIG. 2. This automatically acquired data can be manually supplemented/corrected by the user in the fields shown below 156 in FIG. 2.

The app 110 then automatically modifies one or more of the driver support files 126 by adding the identifying information shown in FIG. 2 to a file (e.g., an extensible markup language (XML) file) of one or more of the driver support files 126. If multiple driver support files 126 are modified, each modified driver support file 126 is individually subjected to the multiple tests to determine which modified driver support files 126, if any, will properly operate with the new card reader 122 or card 124.

Figure 3:
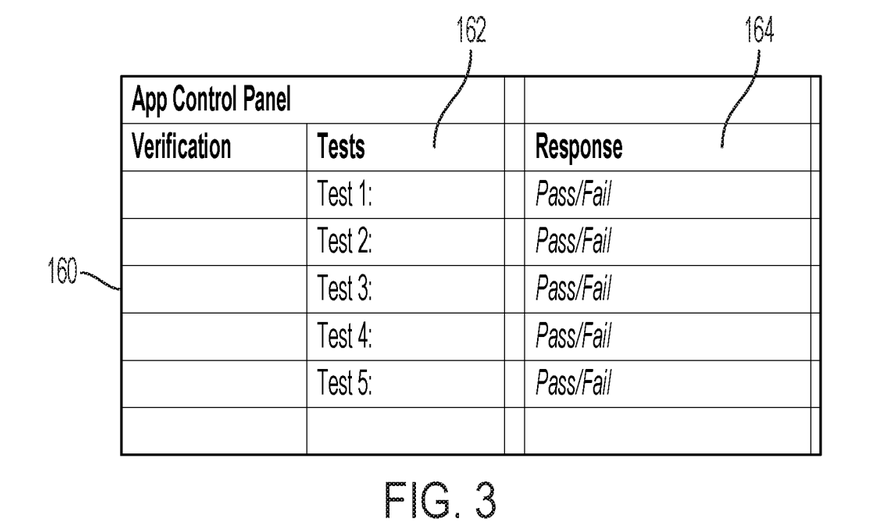

Before actually testing the modified driver support file(s) 126, the app 110 stores a backup of the existing driver support files (e.g., backup of the existing driver support files). Then the app 110 facilitates a series of communication and operation tests on the new card reader or new card using the modified driver support file(s). The app 110 either automatically implements testing routines or outputs a message for a user (e.g., systems administrator) to do so, with the needed tests being specified to the user. For example, the connection to a new card reader 122 can be automatically or manually tested by determining if instructions and data can be received and sent. A new card can be tested by determining if the authentication string can be read, whether a scan to email can be performed, whether a scan to home can be performed, etc. The results of the tests can be reported to the user using the exemplary display screen 160 shown in FIG. 3 where the different tests that are facilitated 162 are shown along with the test results 164 (pass or fail).

If the testing of a modified driver support files 126 is unsuccessful, the next modified driver support files 126 can be tested if multiple driver support files 126 were modified. If none of the modified driver support files 126 pass a sufficient number of tests (passing all, or less than all, of the tests may be considered acceptable) the app 110 needs to revert to the previously existing driver support file(s) 126; and, therefore, the app 110 deactivates the modified driver support file(s) 126 and reactivates the backup of the existing driver support file(s) 126.

However, if a minimum number of tests are passed (again, potentially all tests must be passed), the testing of a specific modified driver support files 126 may be considered to be successful, which allows the app 110 to approve of that modified driver support file 126. In the case of a modified driver support file 126 passing testing, the app 110 leaves the backup of the existing driver support file 126 deactivated as the backup of the existing driver support file 126 is now superseded by the modified driver support files 126.

The app 110 performs the process of supplying the modified driver support file to other devices 130, 132 that are separate from the access-controlled device 120 by making a clone file from the testing-approved modified driver support files 126. The app 110 can share the clone file with the other devices 130, 132 separate from the access-controlled device 120 through the computerized network 202 by peer-to-peer communications or through server-based downloads, during regular updates or through push interactions. In other alternatives, the app 110 can supplying the testing-approved modified driver files 126 to a module maker 104 through a computerized network 202. In these implementations, the app 110 instructs the module maker 104 to create a downloadable module (DLM) with the testing-approved modified driver files 126 and instructs the module maker to share the DLM with the other devices 130, 132 during regular updates or through push interactions. The clone file or DLM are distinct from the modified driver support file 126 because the clone file contains, in addition, instructions that cause the modified driver support file 126 to auto-install on the device to which it is downloaded and other needed instructions to allow different devices to utilize the modified driver files 126.

The fact that all the devices 120, 130, 132 are connected on the network 202 allows the distribution of the modified driver via cloning (e.g., using a fleet orchestrator). Thus, the network 202 shown in FIG. 1 permits the manual distribution of the modified driver clone file or DLM as well as the automated distribution of the clone file or DLM. This allows all future-presented card readers (that have the same identifying information as the unsupported card reader 122 or unsupported card 124) to be supported card readers 122 on all the other devices 130, 132 that the module maker 104 shares the DLM (or clone file) with.

Figure 4:
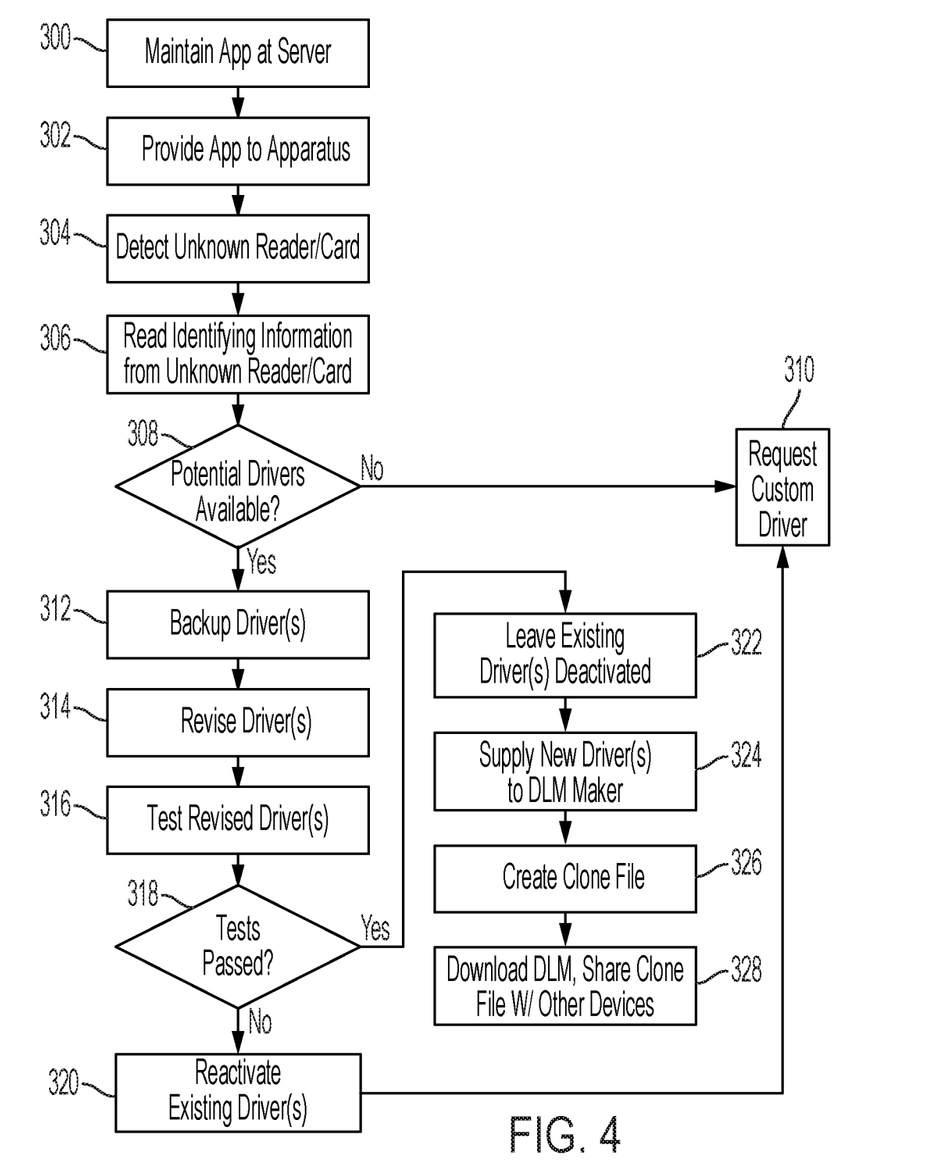
FIG. 4 is a flow diagram of various methods herein.

FIG. 4 is flowchart illustrating exemplary methods herein. In item 300, these methods maintain the app at the computerized server. In item 302, methods herein provide the app from the computer server to the access-controlled device (e.g., a printer, scanner, kiosk, MFP, etc.). These methods then use the downloaded app to check if an unsupported card reader has been connected to the access-controlled device, or an unsupported card has been supplied to the connected card reader in item 304. Specifically, in item 304, the app is adapted to check whether any of the existing driver support files include information for the connected card reader or supplied card. If not, the app automatically begins the process of generating support for the unsupported card reader or unsupported card, as shown in items 306-328 discussed below. In other alternatives, the system administrator can be given the option of whether the process of generating support should be performed; and, therefore, the decision of whether to generate support can be fully manual, fully automatic, or a blend of the two.

More specifically, the app reads the identifying information from the unsupported card reader or unsupported card, as shown in item 306. This will let the app discover identifying information such as the product ID, vendor ID, and answer to reset (ATR) string of the unsupported card, etc. The app then uses the identifying information found in item 306 to determine whether any of the drivers existing currently on the access-controlled device may potentially work with the unsupported card reader or card in item 308. In one example, the app can determine whether to perform the process of modifying an existing driver support file for a specific driver based on a similarity measure between the identifying information from the unsupported card reader or the unsupported card and identifying information of card readers and cards that the existing driver support file handles before being modified.

More specifically, in item 308, the existing driver support files of the access-controlled device are known to work with card readers and cards of specific types or families, or are known to work with card readers or cards from certain manufacturers or industry segments. If the unsupported device or card are discovered to be of that same type, family, or manufacturer/industry segment origin in item 306, the driver will be considered potentially useful for that unknown card reader or card in item 308. Thus, for example, an existing driver support file matching more information regarding type, family, manufacturer, industry with the unsupported card reader or card will have a higher similarity measure relative to an existing driver support file matching less of such information of the unsupported card reader or card. Additionally, external databases containing driver support files not present within the access-controlled apparatus can also be checked in item 308 to determine if those databases contain any potentially useful drivers and associated driver support files for the unsupported device or card; and, if so, such potentially useful drivers and driver support files are downloaded to the access-controlled device by the app in item 308 to be available for automatic modification.

If no potentially useful driver support files are found in the access-controlled device or external databases in item 308 (none have a sufficient similarity measure), processing then proceeds to item 310 where an automated or manually generated request for the creation of a custom driver support file can be made, and such a custom driver support file is prepared using conventional methods, some of which are mentioned above.

However, if at least one potentially useful driver support file that has a sufficient similarity measure is found in the access-controlled device or external databases in item 308, a backup of the existing driver support file(s) is (are) created in item 312. Then, the identifying information from the unsupported card reader or unsupported card produced in item 306 is added to the existing driver support file(s) in item 314 to produce one or more modified driver support files.

The modified driver support files are then tested in item 316. More specifically, in item 316, these methods automatically or manually test the unsupported card reader or unsupported card by facilitating a series of communication and operation tests of the unsupported card reader or unsupported card using the modified driver support file(s). Item 318 is a decision box of whether the testing was successful or not (e.g., whether the unsupported card reader or unsupported card was approved/validated using the modified driver support files (whether tests were passed or failed)).

If the tests are unsuccessful (the modified driver support file(s) failed one or more tests) in item 318, processing moves to item 320 where the modified driver support file is deactivated and the backup of the existing driver support file is reactivated, after which the automated or manually generated request for a custom driver support file can be made in item 310.

However, if the tests are successful, processing moves from item 318 to item 322 where the backup of the existing driver support files are deactivated but retained, and the modified driver support file(s) remain activated in place. Further, based on successful testing, processing continues, and the app then supplies the modified driver support file to other devices separate from the access-controlled device (shown in items 324-328) so that the unsupported card reader or unsupported card will then be supported on all external devices to which the modified driver support files are supplied.

The process of supplying of the modified driver support files to the other devices separate from the access-controlled device can be performed in multiple ways. In one implementation, the app can supply the modified driver support files to a module maker through a computerized network, as shown in item 324. The module maker creates a downloadable module (DLM) with the modified driver support file in item 324. In an alternative implementation, the app can create a clone file of the modified driver support file in item 326. The clone file can be an exact copy of the modified driver support file or can be a copy that also includes additional instructions relating to usage, installation, unpackaging, etc.

The DLM and/or clone files are then provided to (downloaded or peer-shared and installed by) the other devices separate from the access-controlled device (e.g., other printers, other access-controlled devices, etc.) through the computerized network, as shown in item 328. Specifically, the DLM can be downloaded on demand, during updates, through push processes, etc.; and/or the clone files can be shared through peer-to-peer sharing processes in item 328. Then, all card readers having the identifying information of the unsupported card reader or unsupported card will be supported card readers on the other devices that have downloaded and installed the DLM and/or clone file(s).

Figure 5A:
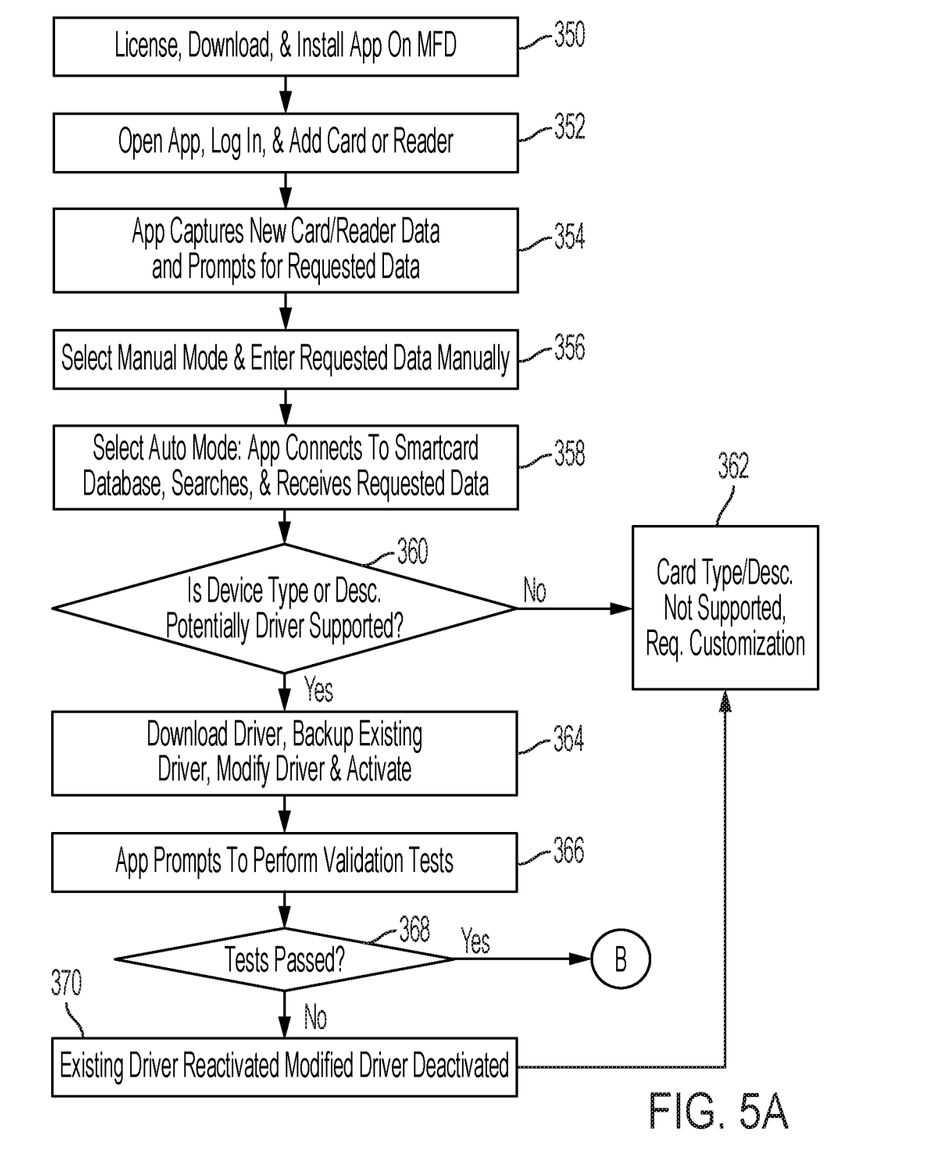
FIG. 5A-5B are two parts of the same flow diagram of various methods herein.
Figure 5B:
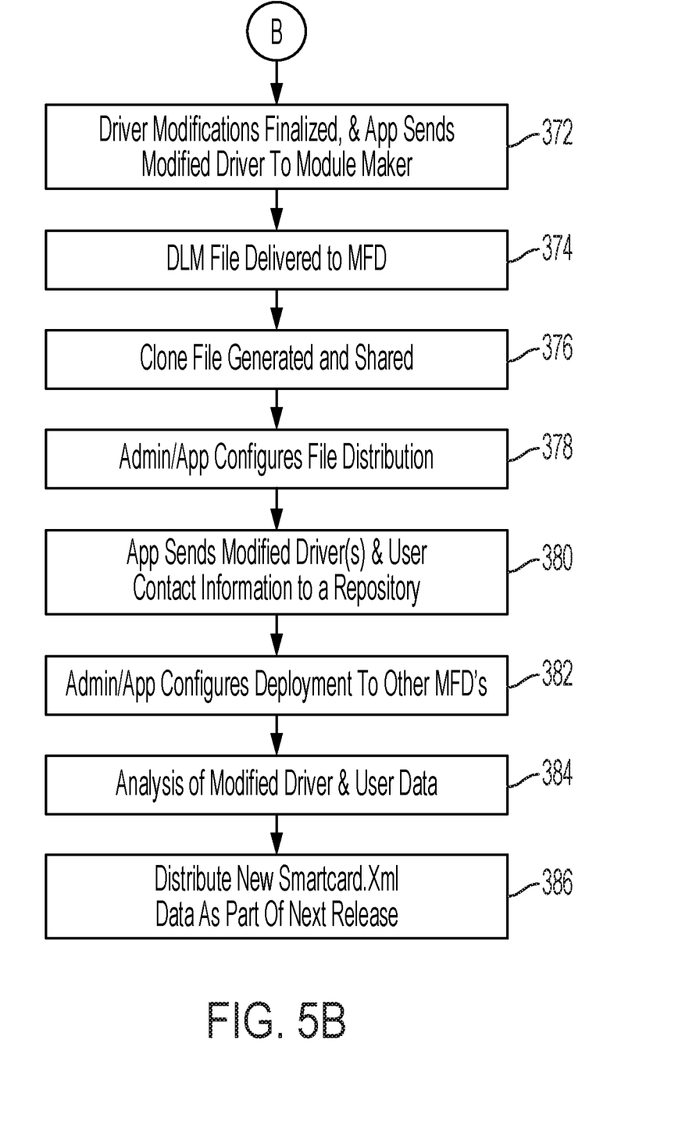

FIGS. 5A-5B shows are narrower example of one implementation of the methods and systems herein. As shown in FIGS. 5A-5B, in item 350 an analyst can license, download, and install the self-adding card/card reader app to an MFD. In item 352, the analyst can open the self-adding card/card reader app, log in, and insert an unsupported card into an existing card reader or connect an unsupported new card reader.

In item 354, the app captures the new card or card reader data and the app can prompt the analyst for requested data. As shown in item 356 (and FIG. 2, discussed above) the analyst can select manual mode 156 and enter the requested data manually or, as shown in item 358, the analyst can select auto mode 158 (FIG. 2), which causes the app to connect to the appropriate database where the app searches for, and receives, requested data (e.g., device type, device description, etc.), such as that shown in the fields below 158 in FIG. 2.

Item 360 is a decision box determining whether the manually or automatically generated device type, device description, etc., is noted as being potentially supported by any driver support file (e.g., XML file) resident on the access-controlled device 120 or that can be provided to the access-controlled device 120 by the computer server 100. Driver support files may potentially be used with new card readers or cards because they may be the same type, of the same family, from the same manufacturer, etc.; however, testing is facilitated (as described below) to ensure that the potentially useful driver support files are actually useful with the new card reader/card.

As shown in item 362, if no driver support file is found within the access-controlled device 120 or within the computer server 100 that can potentially support the type or description that is found in items 356 or 358, then a new driver support file is needed and a message is displayed that the device type and/or description is not supported that that customization should be requested.

On the other hand, if there is a driver support file within the access-controlled device 120 (or a driver support file within the computer server 100 that is downloadable to the access-controlled device) that can potentially support the type or description that is found in items 356 or 358, then processing moves to item 364. In item 364 the potentially usable driver support file is downloaded, if needed, and a backup of the existing copy of the downloaded or existing driver support file is made. Also in item 364, the downloaded or existing driver support file is modified by adding the appropriate data (e.g., ATR string, PID, VID, etc.) to create a modified driver support file, and that modified driver support file is activated and made ready for testing, while the existing driver support file is deactivated.

In item 366, the app prompts the analyst to perform validation tests, at which point the new card reader or card is tested with the modified driver support file. Again, a series of communication and operation tests is performed. Item 368 is a decision box as to whether a minimum number (potentially all) tests were passed. If there are additional potential driver support files that might be used with the new card reader or card, subsequent steps can be delayed while the additional potential driver support files are modified and tested. Therefore, there may be many modified driver support files that pass testing; however, if all potential driver support files fail testing in item 368, processing proceeds to item 370 where the backup of the existing driver support file is restored as the active file and the modified driver support file(s) that failed the testing is/are deactivated. Additionally, if no driver support file passed testing in item 368, processing proceeds from item 370 to item 362 so that a customized driver support file can be prepared.

However, if at least one of the modified driver support files passed testing, processing proceeds to item 372 (following bubble B from FIG. 5A to FIG. 5B). In item 372 in FIG. 5B, any needed driver support file modifications are finalized, and the app sends all modified driver support files that passed testing to the module maker, which makes a DLM for each of the modified driver support files that passed testing. In item 374, all DLMs are provided to the access-controlled device to allow the access-controlled device to fully operate with the card reader/card. In addition, or as an alternative, a clone file can be generated and peer shared as shown in item 376.

In item 378, either an administrative person or the app configures a file distribution for the modified driver support files that passed testing. Then, the app sends the modified driver support file(s) and user contact information to a corporate repository, as shown in item 380. Also, in item 382, the administrative person or the app configures the deployment of the modified driver support file(s) to other access-controlled devices using various fleet-wide distribution software and other selectable methods. Item 384 shows that the modified driver support file(s) and user data can be analyzed once in the corporate repository (potentially using artificial intelligence (AI) processes) for use in automatically creating driver support file documentation or other applications such as to discover which card reader and card vendors and device models are actively being used with existing devices. Also, as shown in item 386, the modified driver support file(s) can be distributed to access-controlled devices as part of upcoming update releases.

Figure 6:
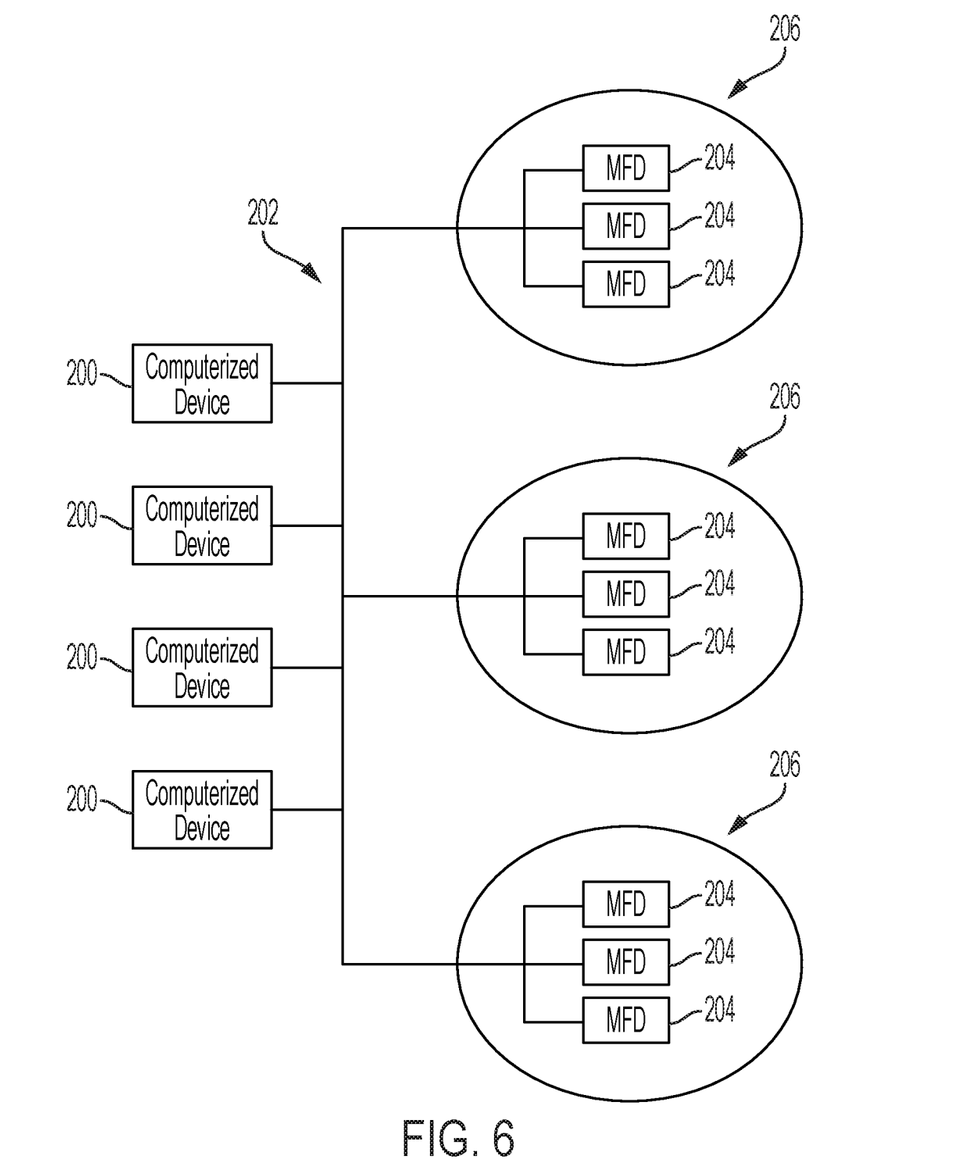
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
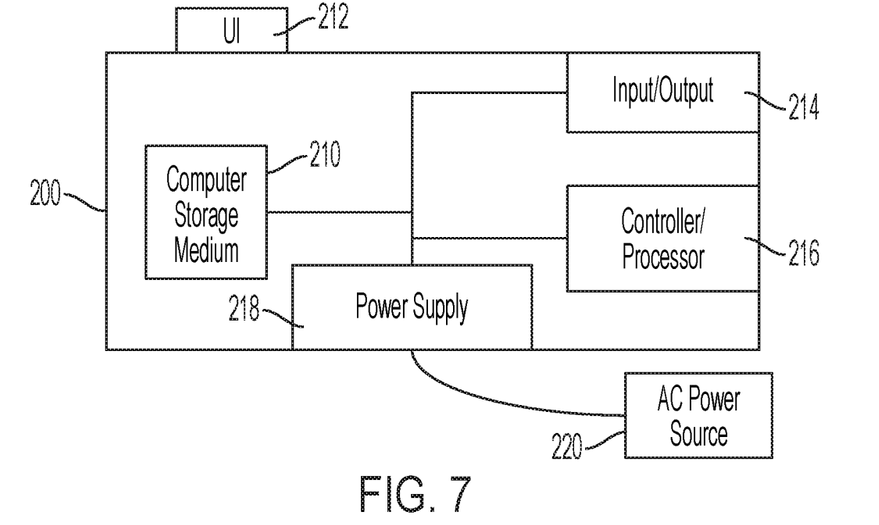
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a user interface (UI) assembly 212. The user may receive messages, instructions, and menu options from, and enter instructions through, the user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc.), etc.

Figure 8:
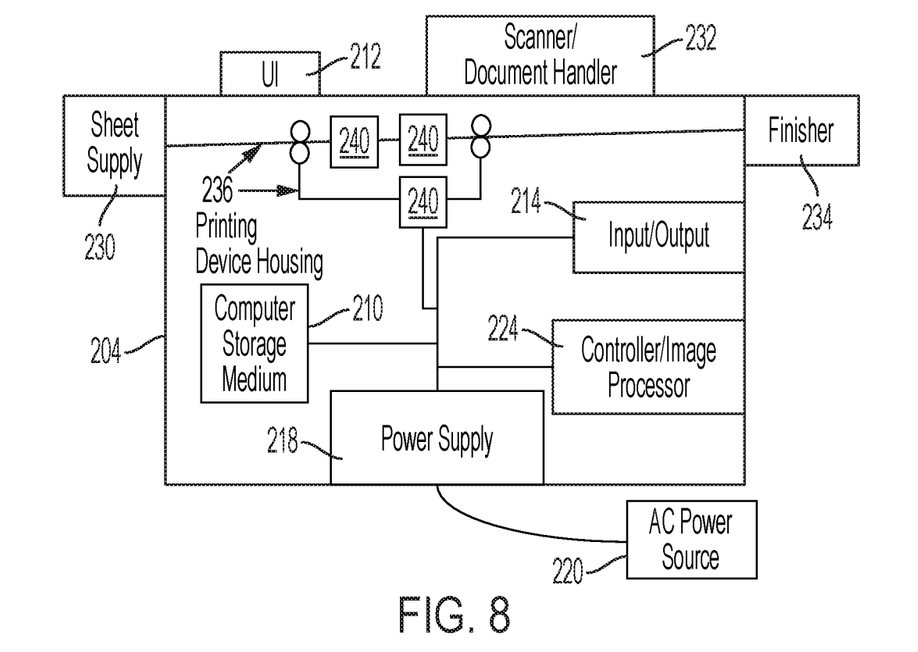
FIG. 8 is a schematic diagram illustrating devices herein.

FIG. 8 illustrates a computerized device that is a printing device 204, which can be one of the access-controlled devices discussed above and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the card reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and card reader focus.

The terms printer or printing device as used herein encompasses any device, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A device comprising:
    a processor;
    functional components operatively connected to the processor;
    a user interface operatively connected to the processor;
    a connected card reader operatively connected to the processor; and
    a computer storage device operatively connected to the processor,
    wherein the processor is configured to recognize whether the connected card reader is an unsupported card reader or whether an unsupported card is supplied to the connected card reader,
    wherein the processor is configured to automatically modify driver support files in the computer storage device to communicate with the unsupported card reader or the unsupported card by:
        reading identifying information from the unsupported card reader or the unsupported card;
        modifying an existing driver support file by adding the identifying information to the existing driver support file to create a modified driver support file;
        testing the unsupported card reader or the unsupported card using the modified driver support file by:
            storing a backup of the existing driver support file before creating the modified driver support file;
            deactivating the backup of the existing driver support file and activating the modified driver support file;
            facilitating a series of communication and operation tests on the unsupported card reader or the unsupported card using the modified driver support file;
            deactivating the modified driver support file and reactivating the backup of the existing driver support file based on tests being unsuccessful; and
            keeping the backup of the existing driver support file deactivated based on the testing being successful; and
        supplying the modified driver support file to other devices separate from the device based on the testing being successful.

2. The device according to claim 1, wherein the processor performs the supplying of the modified driver support file to the other devices separate from the device by:
    creating a clone file from the modified driver support file; and
    sharing the clone file with the other devices separate from the device through a computerized network.

3. The device according to claim 1, wherein the processor is configured to determine whether to perform the modifying of the existing driver support file based on a similarity measure between the identifying information from the unsupported card reader or the unsupported card and identifying information of card readers and cards that the existing driver support file handles before being modified.

4. The device according to claim 1, wherein a supported card reader is one identified within at least one driver support file stored within the device, and wherein an unsupported card reader is one not identified within at least one driver support file stored within the device.

5. The device according to claim 1, wherein the device may only be operated using a supported card reader and a supported card.

6. The device according to claim 1, wherein the identifying information comprise a vendor identification, a product identification, and an answer to reset (ATR) string of the unsupported card.

7. A system comprising:
    a printer having a connected card reader, wherein the printer comprises a computer storage device;
    a computer server in communication with the printer through a computerized network; and
    a computer application (app) maintained by the computer server,
    wherein the computer server is configured to provide the app to the printer,
    wherein the app is configured to control the printer to recognize whether the connected card reader is an unsupported card reader or whether an unsupported card is supplied to the connected card reader,
    wherein the app is configured to automatically control the printer to modify driver support files in the computer storage device to communicate with the unsupported card reader or the unsupported card by:
        reading identifying information from the unsupported card reader or the unsupported card;
        modifying an existing driver support file by adding the identifying information to the existing driver support file to create a modified driver support file;
        testing the unsupported card reader or the unsupported card using the modified driver support file by:
            storing a backup of the existing driver support file before creating the modified driver support file;
            deactivating the backup of the existing driver support file and activating the modified driver support file;
            facilitating a series of communication and operation tests on the unsupported card reader or the unsupported card using the modified driver support file;
            deactivating the modified driver support file and reactivating the backup of the existing driver support file based on tests being unsuccessful; and
            keeping the backup of the existing driver support file deactivated based on the testing being successful; and supplying the modified driver support file to other devices separate from the printer based on the testing being successful.

8. The system according to claim 7, wherein the app is configured to control the printer to perform the supplying of the modified driver support file to the other devices separate from the printer by:
   creating a clone file from the modified driver support file; and
   sharing the clone file with the other devices separate from the printer through the computerized network.

9. The system according to claim 7, wherein the app is configured to control the printer to determine whether to perform the modifying of the existing driver support file based on a similarity measure between the identifying information from the unsupported card reader or the unsupported card and identifying information of card readers and cards that the existing driver support file handles before being modified.

10. The system according to claim 7, wherein a supported card reader is one identified within at least one driver support file stored within the printer, and wherein an unsupported card reader is one not identified within at least one driver support file stored within the printer.

11. The system according to claim 7, wherein the printer may only be operated using a supported card reader and a supported card.

12. The system according to claim 7, wherein the identifying information comprise a vendor identification, a product identification, and an answer to reset (ATR) string of the unsupported card.

13. A method comprising:
   providing an app from a computer server to a device, wherein the device comprises a computer storage device;
   controlling the device, by the app, to detect an unsupported card reader or detect an unsupported card supplied to a connected card reader of the device; and
   automatically generating support for the unsupported card reader or the unsupported card by the app by:
      reading identifying information from the unsupported card reader or the unsupported card;
      modifying an existing driver support file in the computer storage device by adding the identifying information to the existing driver support file to create a modified driver support file;
      testing the unsupported card reader or the unsupported card using the modified driver support file by:
         storing a backup of the existing driver support file before creating the modified driver support file;
         deactivating the backup of the existing driver support file and activating the modified driver support file;
         facilitating a series of communication and operation tests on the unsupported card reader or the unsupported card using the modified driver support file;
         deactivating the modified driver support file and reactivating the backup of the existing driver support file based on tests being unsuccessful; and
         keeping the backup of the existing driver support file deactivated based on the testing being successful; and
      supplying the modified driver support file to other devices separate from the device based on the testing being successful.

14. The method according to claim 13, wherein the supplying of the modified driver support file to the other devices separate from the device comprises:
   creating a clone file from the modified driver support file; and
   sharing the clone file with the other devices separate from the device through a computerized network.

15. The method according to claim 13, further comprising determining whether to perform the modifying of the existing driver support file based on a similarity measure between the identifying information from the unsupported card reader or the unsupported card and identifying information of card readers and cards that the existing driver support file handles before being modified.

16. The method according to claim 13, wherein a supported card reader is one identified within at least one driver support file stored within the device, and wherein an unsupported card reader is one not identified within at least one driver support file stored within the device.

17. The method according to claim 13, wherein the device may only be operated using a supported card reader and a supported card.

* * * * *